United States Patent [19]

Ficken et al.

[11] 4,426,017

[45] Jan. 17, 1984

[54] APPARATUS FOR DISPENSING CONTAINERS FROM A STACK OF NESTED CONTAINERS

[75] Inventors: Leonard A. Ficken, Manchester; Gerald J. Podgorny, St. Louis County, both of Mo.

[73] Assignee: UMC Industries, Inc., Stamford, Conn.

[21] Appl. No.: 273,506

[22] Filed: Jun. 15, 1981

[51] Int. Cl.³ .............................................. B65G 59/06
[52] U.S. Cl. .................................... 221/222; 221/241
[58] Field of Search ............... 221/221, 222, 223, 241, 221/297; 414/129, 900

[56] References Cited

U.S. PATENT DOCUMENTS

| | | | |
|---|---|---|---|
| 2,184,029 | 12/1939 | Wicklund | 221/297 X |
| 2,268,421 | 12/1941 | Reifsnyder et al. | 221/222 |
| 3,071,292 | 1/1963 | Atwood et al. | 221/223 |
| 3,120,324 | 2/1964 | Amberg et al. | 221/221 X |
| 3,279,652 | 10/1966 | Willvonseder | 221/223 |
| 3,426,941 | 2/1969 | Hovekamp | 221/222 |
| 3,712,483 | 1/1973 | Messervey | 221/222 X |
| 3,899,102 | 8/1975 | Lack et al. | 221/6 |

Primary Examiner—F. J. Bartuska
Attorney, Agent, or Firm—Senniger, Powers, Leavitt and Roedel

[57] ABSTRACT

Apparatus for dispensing containers, such as paper cups, each having an outwardly extending rim, from a stack of nested containers, the apparatus being adjustable to handle containers of different diameters within a range of diameters.

5 Claims, 5 Drawing Figures

APPARATUS FOR DISPENSING CONTAINERS FROM A STACK OF NESTED CONTAINERS

BACKGROUND OF THE INVENTION

This invention relates to apparatus for dispensing containers from a stack of nested containers, and more particularly to such apparatus for dispensing cups or the like, each having an outwardly extending rim, from a stack in which the cups are nested one within another.

The present invention is especially concerned with dispensing apparatus which is adjustable for handling containers of different size (i.e., having different rim diameters) within a range of sizes, such as 6 oz.-16 oz. paper cups. Reference may be made to U.S. Pat. Nos. 3,899,102, 3,279,652 and 3,071,292 for dispensing apparatus generally in the field of this invention.

SUMMARY OF THE INVENTION

Among the several objects of this invention may be noted the provision of improved dispensing apparatus which is readily adjustable for handling containers, such as paper cups, of different diameters within a range of diameters; the provision of such apparatus having a greater range of adjustment than prior art dispensers for handling a greater range of container sizes; and the provision of such dispensing apparatus which is economical to manufacture.

Generally, dispensing apparatus of the present invention comprises a casing having a stack-accommodating opening therethrough adapted to be mounted with the axis of the opening generally vertical, the opening being dimensioned to accommodate containers up to the largest of the aforesaid range, and a plurality of arms each pivoted at one end of the casing on a generally vertical axis. The arms are spaced at intervals around the opening and extend at their other ends into the opening, and are swingable in and out relative to the axis of the opening on their pivot axes for adjustment to handle containers of different diameters. The apparatus also includes a plurality of cams, one for each arm, each cam being rotatable on a generally vertical axis on the respective arm at its said other end in the opening. Each cam is rotatable in one direction on its arm from a first position wherein the cams support the stack by engagement of the rim of the lowermost container with the cams, to a second position for stripping the lowermost container from the next container above and releasing the lowermost container to drop while retaining said next container supported on the cams by engagement of the rim of the next container with the cams and thus supporting the stack, the cams then being rotatable back to their stated first position. Means for rotating the cams in unison between their stated first and second positions comprises gearing associated with each arm including a pinion rotatable on the pivot axis of the arm and a ring gear rotatable in the casing surrounding the pinions and in mesh therewith. And adjustment means is provided for swinging the arms in and out to different positions of adjustment and holding them in adjusted position for handling containers of different diameters.

Other objects and features will be in part apparent and in part pointed out hereinafter.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
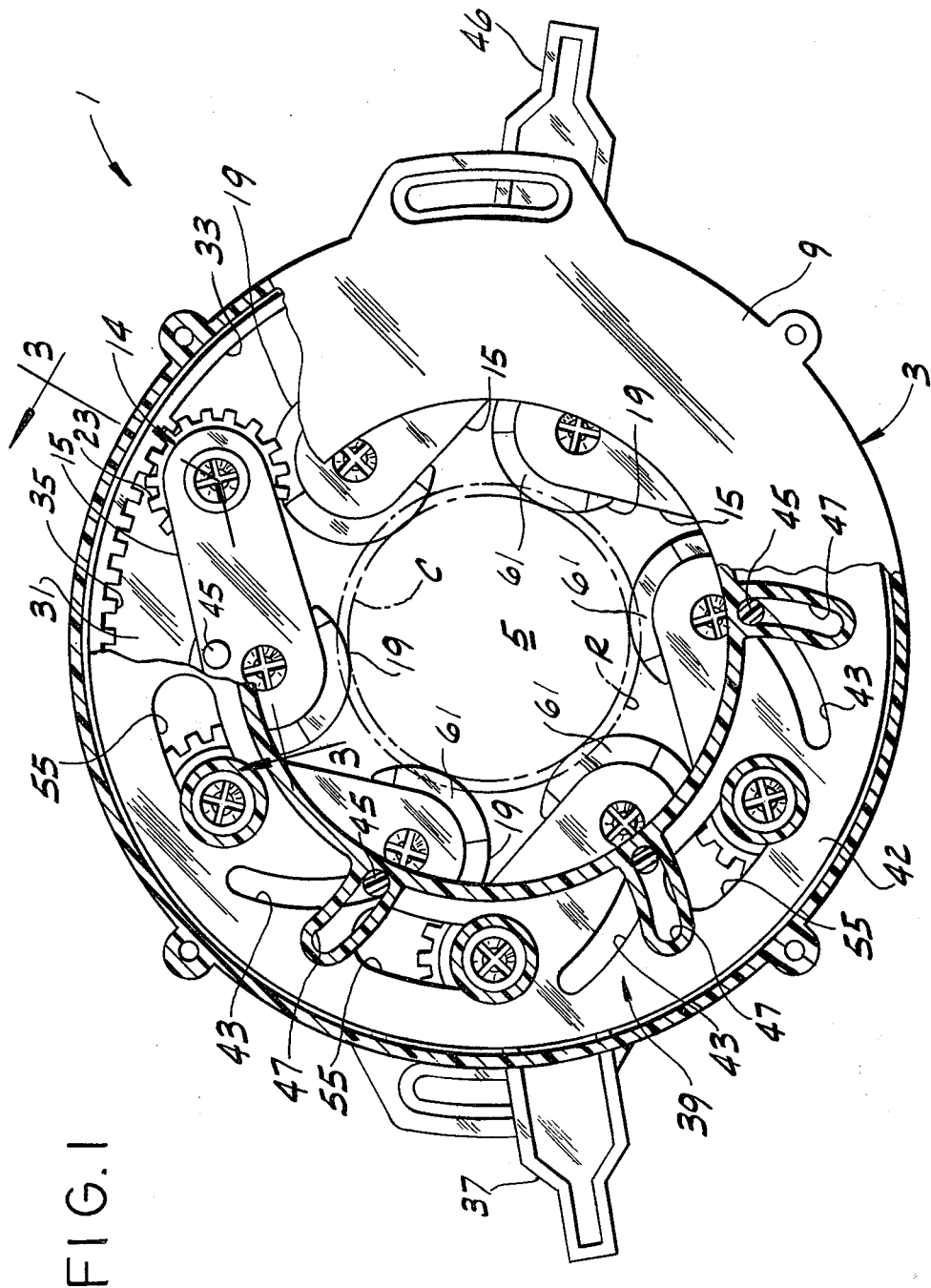
FIG. 1 is a top plan view of dispensing apparatus of this invention, with parts broken away and parts shown in section to illustrate details.
Figure 2:
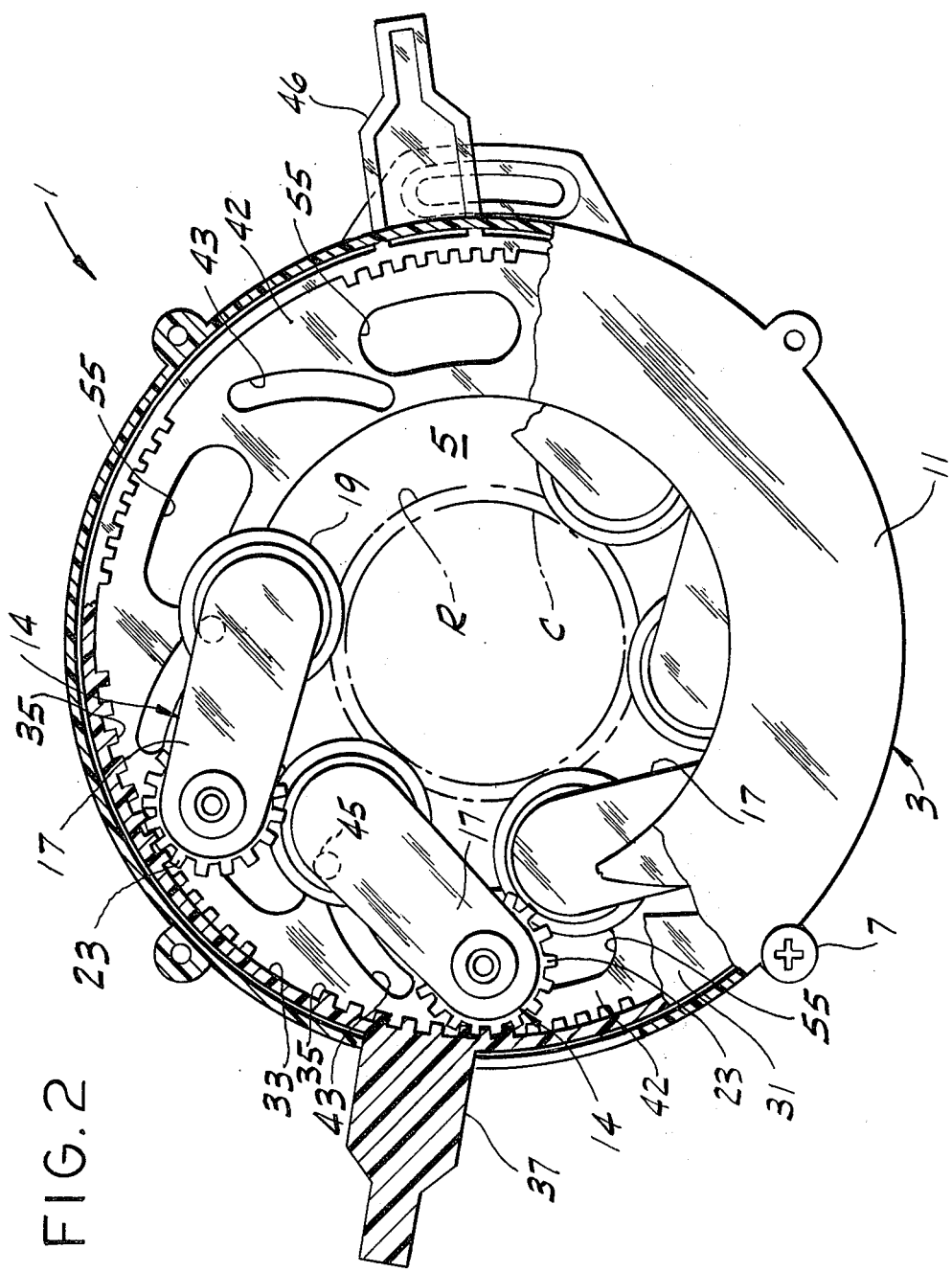
FIG. 2 is a bottom plan view with parts broken away and parts shown in section.

Referring now to the drawings, first more particularly to FIG. 1, there is generally indicated at 1 apparatus for use in hot and cold drink vendors, for example, for dispensing containers C (shown in phantom), such as paper cups, each having an outwardly extending rim R, from a stack of nested containers. In accordance with this invention, the apparatus 1 is adapted to handle containers of different diameters (i.e., rim diameters) within a range of diameters. Thus the apparatus 1 may be designed to handle paper cups ranging in size from 6-16 oz. cups.

Figure 3:
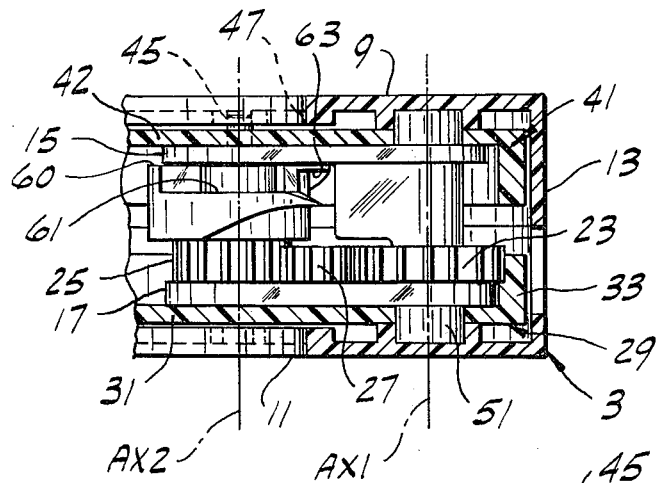
FIG. 3 is a vertical section on line 3—3 of FIG. 1, with some parts shown in section and other parts, including a cam assembly, shown in full elevation for purposes of clarity.

Apparatus 1 comprises a casing generally designated 3 having a circular stack-accommodating opening 5 therethrough, the casing being adapted to be mounted in conventional fashion inside a vendor, for example, with the central axis of the opening generally vertical. The casing is of split construction, comprising upper and lower halves (preferably of molded plastic) secured together by suitable fasteners 7, and is generally annular in shape, having top and bottom annular walls 9 and 11 and a circular (cylindric) side wall 13 at the outer peripheries of the top and bottom walls. The inner peripheral edges of the top and bottom walls define the opening 5, which is dimensioned to accommodate containers C up to the largest of the aforementioned range. The apparatus 1 also includes a plurality of arms 14 (e.g., 6 arms) spaced at intervals around the opening 5, each arm including generally parallel upper and lower members designated 15 and 17, respectively, spaced one above the other. Each arm 14 is pivoted at one of its respective ends in the casing 3 on a generally vertical axis AX1 (see FIG. 3), its other end extending into the opening 5. The two members 15, 17 of each arm are swingable conjointly in and out relative to the central axis of the opening on pivot axes AX1 for adjustment to handle containers C of different diameters.

Each arm 14 mounts a cam or, more specifically, an escapement member 19 in the opening 5 for rotation on a generally vertical axis AX2 offset from the pivot axis AX1. The escapement member is rotatable in one direction on the arm from a first position wherein the escapement members support the stack by engagement of the rim R of the lowermost container C with the members 19, to a second position for stripping the lowermost container from the next container above and releasing the lowermost container to drop while retaining the next container supported on the escapement members by engagement of the rim of the next container with the members and thus supporting the stack, the escapement members then being rotatable back to their stated first position.

Means for rotating the escapement members 19 in unison between their first and second positions comprises gearing associated with each arm 14, including a pinion 23 rotatable on the pivot axis AX1 of the arm, a gear wheel 25 integrally formed (e.g., molded) with the escapement member at the lower end thereof, and an idler gear 27 rotatable on the lower member 17 of the arm and in mesh with the pinion 23 and the gear wheel 25, the arrangement being such that rotation of the pinion 23 effects rotation of the escapement member 19. The pinions, and thus the escapement members, are rotated in unison by means of a ring gear 29 which is mounted for rotation inside the casing 3 generally on the central axis of the opening 5. The ring gear has a flat annular portion 31 disposed in a generally horizontal plane immediately above the bottom wall 11 of the casing 3, and a circular flange portion 33 extending vertically upwardly from the annular portion at the outer periphery thereof adjacent but spaced inwardly from the side wall 13 of the casing. The flange portion 33 surrounds the pinions 23 and is formed with a plurality of gear segments 35 spaced at intervals around its inner periphery which mesh with the pinions 23. The ring gear 29 may be rotated manually first in one direction and then in the other by means of a lever 37 projecting from the ring gear through a slot in the side wall 13 of the casing 3. The ring gear is preferably molded from a suitable plastic, such as that sold under the trade designation "Celcon M90-04" by Celanese Plastics Co.

Indicated generally at 39 is means for moving the arms 14 in and out to different positions of adjustment and holding them in adjusted positions for handling containers C of different diameters. This means 39 includes an adjustment ring generally designated 41 rotatable inside the casing 3 adjacent the top wall 9 thereof generally on the central axis of the opening 5. The ring 41 is identical in construction to the ring gear 29, having a flat annular portion 42 disposed closely adjacent to and in face-to-face with the top wall 9 of the casing, and a circular flange portion (not numbered but comparable to flange portion 33 of the ring gear) extending vertically downwardly from the annular portion 42 at the outer periphery thereof adjacent but spaced inwardly from the side wall 13 of the casing. Means 39 also includes cam means comprising a pluraltiy of cam slots 43 (e.g., six slots) in the flat portion 42 of the adjustment ring and a plurality of pins 45, one on the upper member 15 of each arm, receivable in the cam slots 43. The slots 43 are so contoured that rotation of the adjustment ring 41 in one direction serves to swing the arms on their respective axes AX1 in toward the central vertical axis of the opening 5 for adjustment to handle containers of smaller diameter within the aforementioned range of diameters, and rotation of the ring 41 in the opposite direction serves to swing the arms out away from the axis of the opening for adjustment to handle containers of larger diameter within the range of diameters. The adjustment ring 41 is rotated by means of a lever 46 which projects out from the ring through a slot in the side wall 13 of the casing 3 generally opposite lever 37 for the ring gear 29. As shown best in FIG. 1, the pins 45 project from their respective arms up through the cam slots 43 and are received in guide slots 47 in the top wall 9 of the casing 3. When the adjustment ring 41 is rotated, the pins are movable in the guide slots, which extend generally radially with respect to the opening 5.

Figure 4:
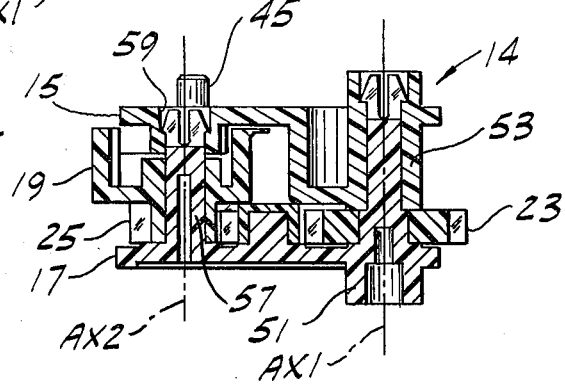
FIG. 4 is a view similar to FIG. 3 showing the cam assembly in section.

The construction of each arm 14 is illustrated in FIG. 4. As shown, the lower member 17 has a vertical pivot 51 at its right end, the lower end of the pivot being journalled in the bottom wall 11 of the casing 3 and the upper end being telescopically received in a tubular pivot 53 which is formed at the right end of the upper member 15 and journalled in the top wall 9 of the casing. The pivots 51 and 53, which together constitute pivot means on which the arm 14 pivots about axis AX1, extend through slots 55 in the flat annular portions of the ring gear 29 and adjustment ring 41. The pivots 51 are engageable with the ends of the slots 55 in the ring gear for limiting rotation of the ring gear and thus confining rotation of the escapement members 19 to rotation between their stated first and second positions. The pinions 23 are held rotatably captive on the pivots 51 between the lower members 17 of the arms and the lower ends of the tubular pivots 53.

A stem 57 projecting up from the lower member 17 of the arm at the left end thereof is received in a hole 59 through the upper member 15 for tying the two members together for conjoint pivotal movement as they are adjusted in and out of the opening 5. The stem 57 also serves to mount the escapement member 19 and gear wheel 25 thereon for rotation about axis AX2.

Figure 5:
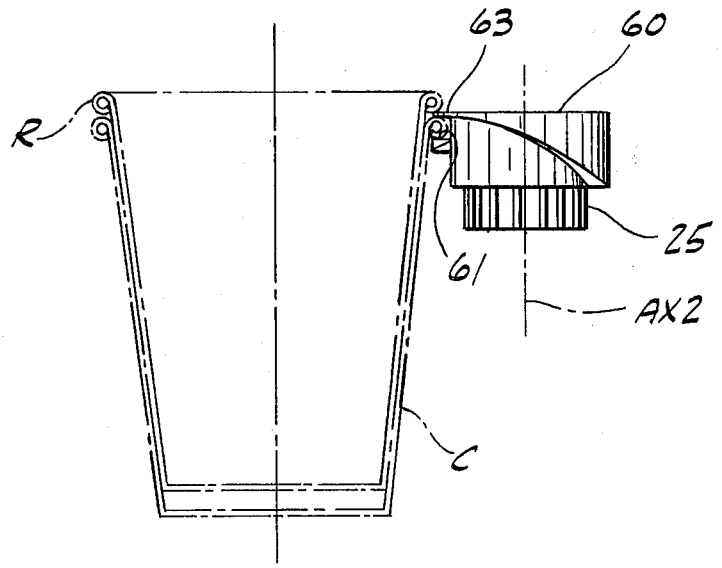
FIG. 5 is an elevation showing a stack of nested cups supported by a cam.

Each escapement member 19 is generally round as viewed from the top, having at its upper end a substantially horizontal top surface 60 and an upwardly facing shoulder or ledge 61 which is downwardly offset from the top surface 60 at the periphery of the escapement member. The escapement member is relieved as illustrated best in FIGS. 3 and 5 to provide a wedging formation 63 spaced above one end of the shoulder 61. The arrangement is such that when the escapement members are in their stated first (FIG. 1) position, the stack of containers C is supported in the opening 5 by engagement of the rim R of the lowermost container C of the stack with the shoulders 61. As the escapement members are rotated toward their second position (by rotating ring gear 29 via lever 37), the wedging formation 63 moves between the rim of the lowermost container and the rim of the container next above it for supporting the stack by the rim of the container next above and for wedging the lowermost container away from the stack so that it readily separates from the stack and drops out of the opening when the escapement members rotate to a position where the shoulders 61 no longer support the container (see FIG. 5). Rotation of the escapement members also imparts a spin to the lowermost cup which helps to overcome any static electricity tending to hold the lowermost cup on the stack. On rotation of the escapement members 19 in the opposite direction back to their stated first position, the stack drops off the wedging formations 63 onto the shoulders 61.

It will be apparent from the above that the dispensing apparatus 1 is readily adjustable to handle containers having different rim diameters by rotating the adjustment ring 41 (via lever 46) to move the escapement members in and out with respect to the opening 5 until they are in the appropriate position. Moreover, the apparatus is economical to manufacture, particularly since the ring gear and adjustment ring are identical parts, as are the upper and lower parts of the casing 3.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. Apparatus for dispensing containers, such as paper cups, each having an outwardly extending rim, from a stack of nested containers, said apparatus being adapted to handle containers of different diameters within a range of diameters, comprising:
   a casing having a stack-accommodating opening therethrough adapted to be mounted with the axis of the opening generally vertical, said opening being dimensioned to accommodate containers up to the largest of said range;
   a plurality of arms each pivoted at one end in the casing on a generally vertical axis, said arms being spaced at intervals around the opening and extending at their other ends into the opening, and being swingable in and out relative to the axis of the opening on their pivot axes for adjustment to handle containers of different diameters;
   a plurality of cams, one for each arm, each cam being rotatable on a generally vertical axis on the respective arm at its said other end in the opening, each cam being rotatable in one direction on its arm from a first position wherein the cams support the stack by engagement of the rim of the lowermost container with the cams, to a second position for stripping the lowermost container from the next container above and releasing the lowermost container to drop while retaining said next container supported on the cams by engagement of the rim of the next container with the cams and thus supporting the stack, the cams then being rotatable back to their stated first position;
   means for rotating the cams in unison between their stated first and second positions comprising gearing associated with each arm including a pinion rotatable on the pivot axis of the arm and a ring gear rotatable in the casing surrounding the pinions and in mesh therewith; and
   an adjustment ring for swinging the arms in and out to different positions of adjustment and holding them in adjusted position for handling containers of different diameters;
   said ring gear and adjustment ring being identical parts.

2. Apparatus as set forth in claim 1 wherein said parts are of molded plastic.

3. Apparatus as set forth in claim 1 wherein each part comprises a flat annular portion disposed in a generally horizontal plane and a circular flange portion extending vertically at the outer periphery of the annular portion.

4. Apparatus for dispensing containers, such as paper cups, each having an outwardly extending rim, from a stack of nested containers, said apparatus being adapted to handle containers of different diameters within a range of diameters, comprising:
   a casing having a stack-accommodating opening therethrough adapted to be mounted with the axis of the opening generally vertical, said opening being dimensioned to accomodate containers up to the largest of said range;
   a plurality of arms each pivoted at one end in the casing on a generally vertical axis, said arms being spaced at intervals around the opening and extending at their other ends into the opening, and being swingable in and out relative to the axis of the opening on their pivot axes for adjustment to handle containers of different diameters;
   a plurality of cams, one for each arm, each cam being rotatable on a generally vertical axis on the respective arm at its said other end in the opening, each cam being rotatable in one direction on its arm from a first position wherein the cams support the stack by engagement of the rim of the lowermost container with the cams, to a second position for stripping the lowermost container from the next container above and releasing the lowermost container to drop while retaining said next container supported on the cams by engagement of the rim of the next container with the cams and thus supporting the stack, the cams then being rotatable back to their stated first position;
   means for rotating the cams in unison between their stated first and second positions comprising gearing associated with each arm including a pinion rotatable on the pivot axis of the arm and a ring gear rotatable in the casing surrounding the pinions and in mesh therewith;
   adjustment means for swinging the arms in and out to different positions of adjustment and holding them in adjusted position for handling containers of different diameters;
   said adjustment means comprising an adjustment ring rotatable inside the casing generally on the axis of said opening, and cam means operable on rotation of the ring in one direction to swing the arms in toward the axis of the opening for adjustment to handle containers of smaller diameter within said range of diameters, and on rotation of the ring in the opposite direction to swing the arms out away from the axis of the opening for adjustment to handle containers of larger diameter within said range of diameters;
   said casing being annular in shape and having annular top and bottom walls and a side wall at the outer perpheries of the top and bottom walls, the inner peripheral edges of the top and bottom walls defining said stack-accommodating opening, said ring gear and adjustment ring being disposed inside the casing adjacent the top and bottom walls thereof with their outer peripheries spaced inwardly from the side wall of the casing, said arms being mounted between the ring gear and adjustment ring for pivotal movement;
   each arm comprising a pair of generally parallel members vertically spaced one above the other with one adjacent the ring gear and the other adjacent the adjustment ring, the members being pivoted at respective ends in the casing for conjoint pivotal movement about said pivot axis, each cam being mounted between a respective pair of members for rotation on said generally vertical axis;
   each arm having pivot means at its pivot end pivoted in the top and bottom walls of the casing, said pinion being rotatable on said pivot means and said gearing further comprising gear teeth on the cam and an idler gear rotatably mounted on one member and in mesh with the gear teeth and the pinion, rotation of the pinion thus effecting rotation of the cam; and said ring gear having a slot therein receiving said pivot means therethrough, said pivot means being engageable with the ends of the slot for limiting rotation of the ring gear thereby to confine rotation of the cams to rotation between said first and second positions.

5. Apparatus for dispensing containers, such as paper cups, each having an outwardly extending rim, from a stack of nested containers, said apparatus being adapted to handle containers of different diameters within a range of diameters, comprising:

a casing having a stack-accommodating opening therethrough adapted to be mounted with the axis of the opening generally vertical, said opening being dimensioned to accommodate containers up to the largest of said range;

a plurality of arms each pivoted at one end in the casing on a generally vertical axis, said arms being spaced at intervals around the opening and extending at their other ends into the opening, and being swingable in and out relative to the axis of the opening on their pivot axes for adjustment to handle containers of different diameters;

a plurality of cams, one for each arm, each cam being rotatable on a generally vertical axis on the respective arm at its said other end in the opening, each cam being rotatable in one direction on its arm from a first position wherein the cams support the stack by engagement of the rim of the lowermost container with the cams, to a second position for stripping the lowermost container from the next container above and releasing the lowermost container to drop while retaining said next container supported on the cams by engagement of the rim of the next container with the cams and thus supporting the stack, the cams then being rotatable back to their stated first position;

means for rotating the cams in unison between their stated first and second positions comprising gearing associated with each arm including a pinion rotatable on the pivot axis of the arm and a ring gear rotatable in the casing surrounding the pinions and in mesh therewith; and adjustment means for swinging the arms in and out to different positions of adjustment and holding them in adjusted position for handling containers of different diameters;

each arm having pivot means at said one end thereof pivoted in the casing, and said ring gear having a slot therein receiving said pivot means therethrough, said pivot means being engageable with the ends of the slot for limiting rotation of the ring gear thereby to confine rotation of the cams to rotation between said first and second positions.

* * * * *